(No Model.) 7 Sheets—Sheet 3.

C. M. CLINTON & J. McNAMARA.
TYPE WRITING MACHINE.

No. 443,932. Patented Dec. 30, 1890.

Witnesses
H. P. Denison
F. F. Denison

Charles M. Clinton
James McNamara
Inventors
By their Attorneys
Smith & Denison (No Model.) 7 Sheets—Sheet 4.

C. M. CLINTON & J. McNAMARA.
TYPE WRITING MACHINE.

No. 443,932. Patented Dec. 30, 1890.

Witnesses

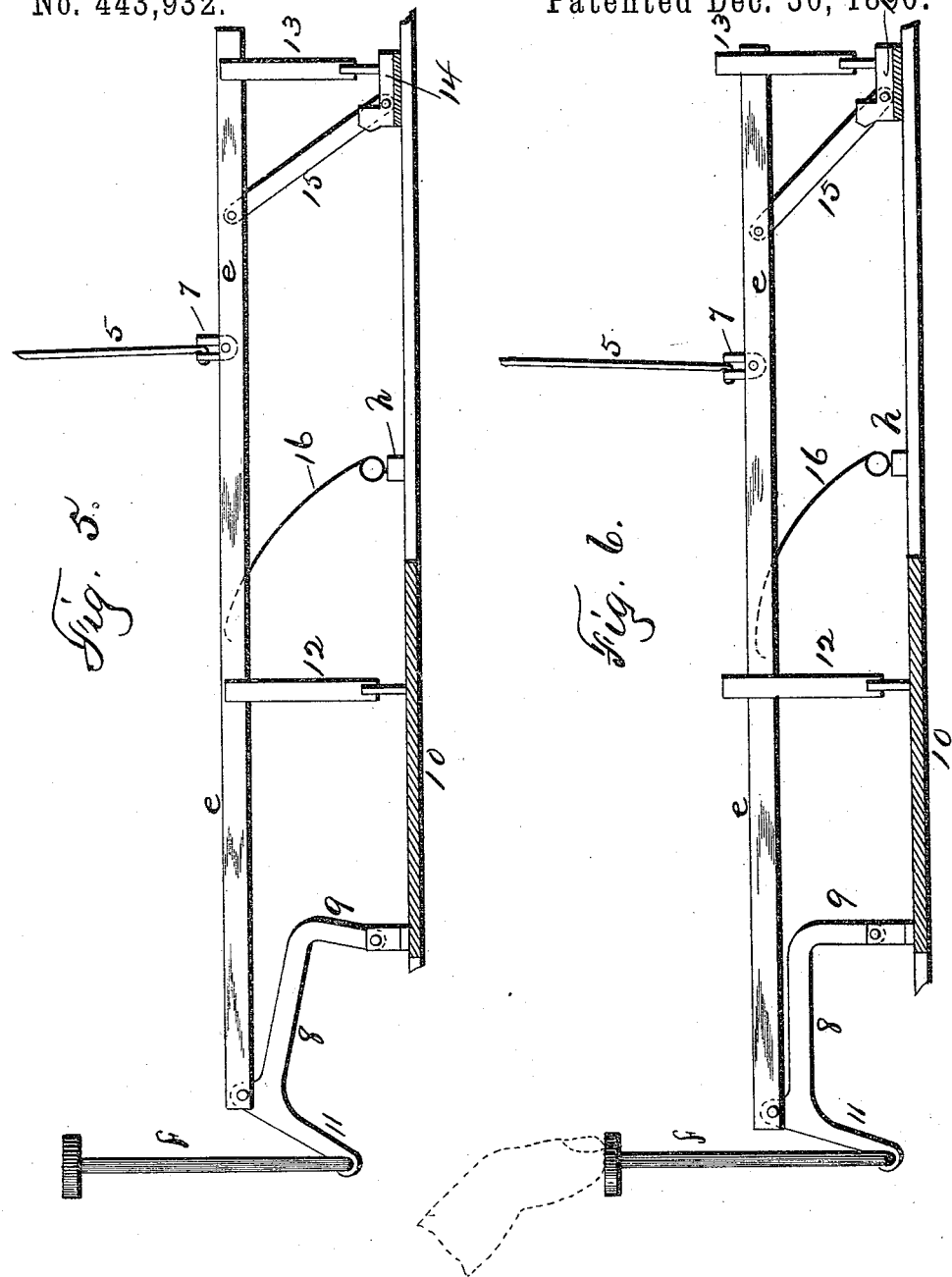

(No Model.) 7 Sheets—Sheet 6.
C. M. CLINTON & J. McNAMARA.
TYPE WRITING MACHINE.
No. 443,932. Patented Dec. 30, 1890.
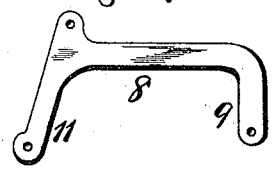
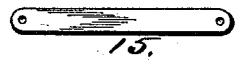
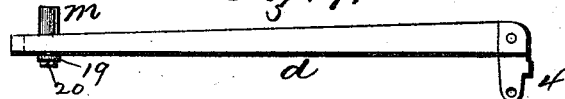
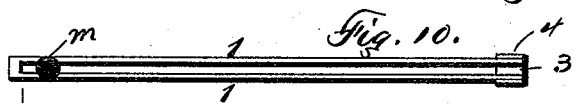
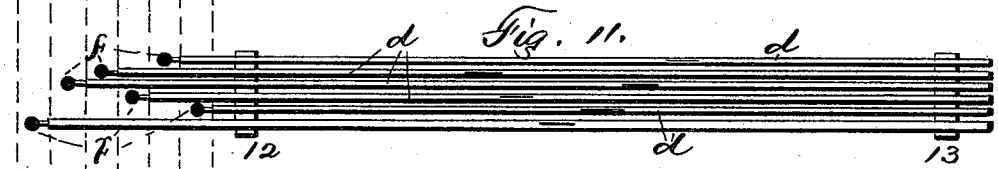
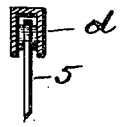
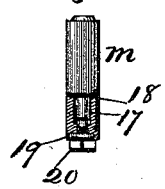
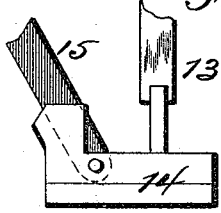
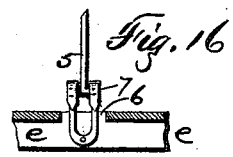
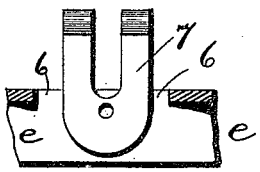
Witnesses
H. P. Denison
F. F. Denison
Charles M. Clinton
James McNamara
Inventors.
By their Attorneys
Smith & Denison
THE NORRIS PETERS CO., PHOTO-LITHO., WASHINGTON, D. C.

(No Model.) 7 Sheets—Sheet 7.
C. M. CLINTON & J. McNAMARA.
TYPE WRITING MACHINE.
No. 443,932. Patented Dec. 30, 1890.
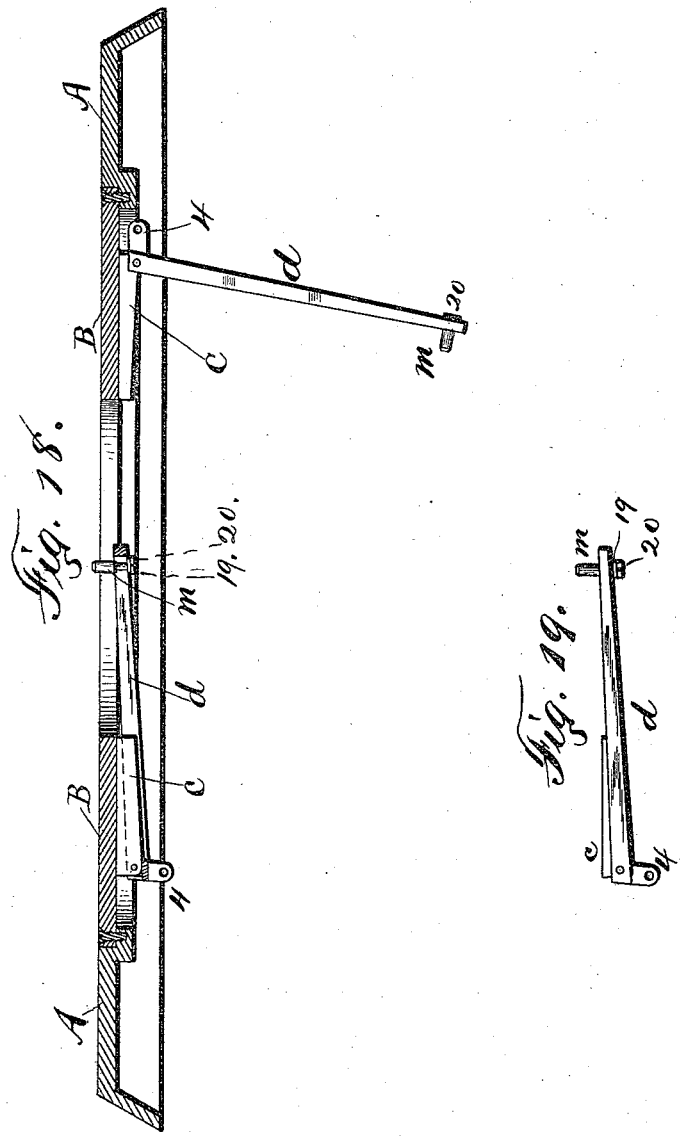

UNITED STATES PATENT OFFICE.

CHARLES M. CLINTON AND JAMES McNAMARA, OF ITHACA, NEW YORK.

TYPE-WRITING MACHINE.

SPECIFICATION forming part of Letters Patent No. 443,932, dated December 30, 1890.

Application filed March 14, 1890. Serial No. 343,836. (No model.)

*To all whom it may concern:*

Be it known that we, CHARLES M. CLINTON and JAMES McNAMARA, of Ithaca, in the county of Tompkins, in the State of New York, have invented new and useful Improvements in Type-Writers, of which the following, taken in connection with the accompanying drawings, is a full, clear, and exact description.

Our invention relates to type-writing machines, and to that class known as "center-strike" machines, which print at a common central point.

The object of our invention is to improve the construction, operation, and utility, simplify the structure, and render the machine more durable and effective in use.

It consists in a novel key-lever and a novel key-lever mechanism, novel type-bar arms, hanger, guides, stops, and type, novel connections between the type-bar arms and the key-levers, a novel type-bar ring, and also in the several other novel elements and combinations of elements which are hereinafter described, and which are specifically set forth in the several clauses of the claim hereto annexed.

It is constructed as follows, reference being had to the accompanying drawings, in which—

Figure 1:
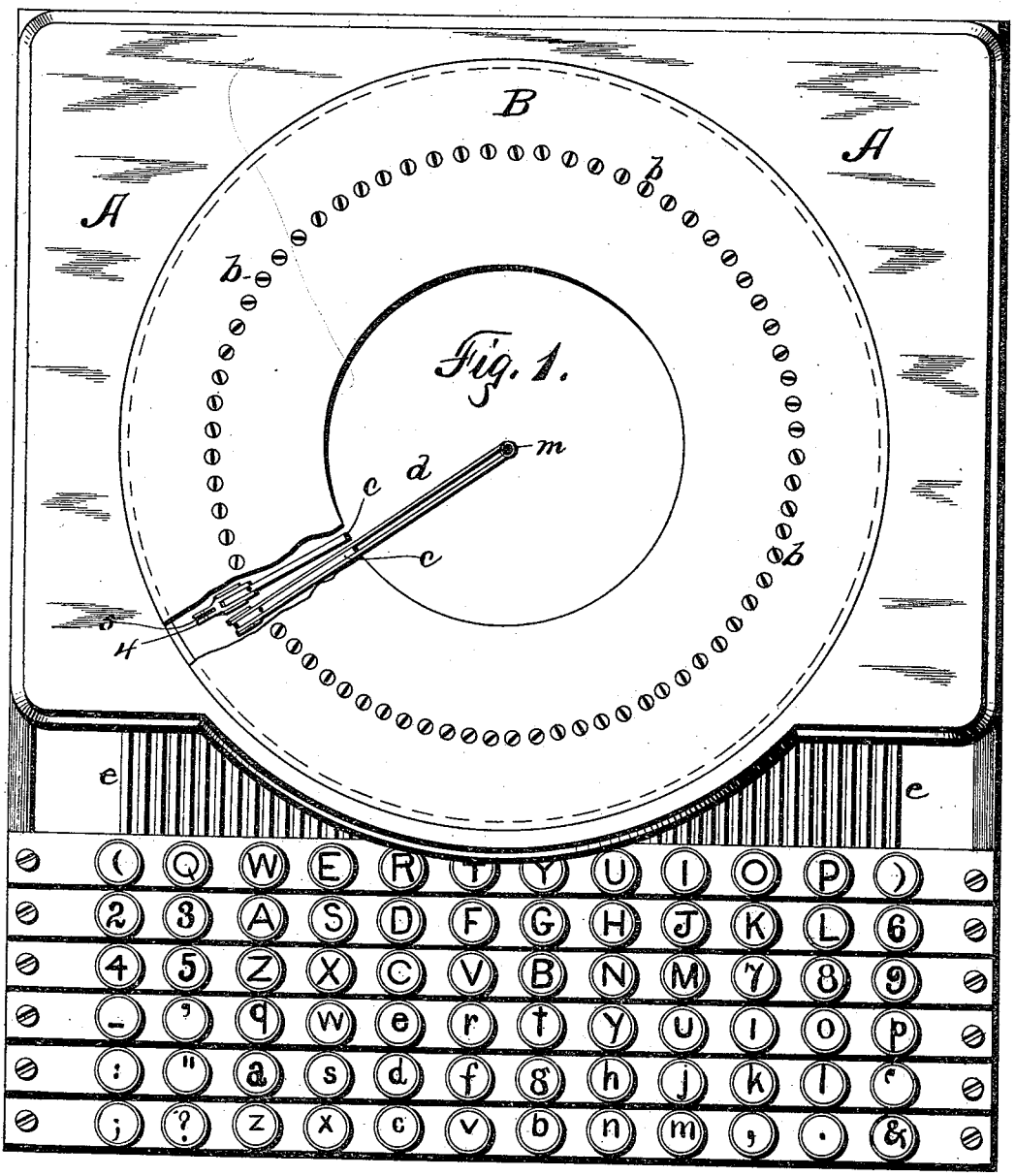
Figure 2:
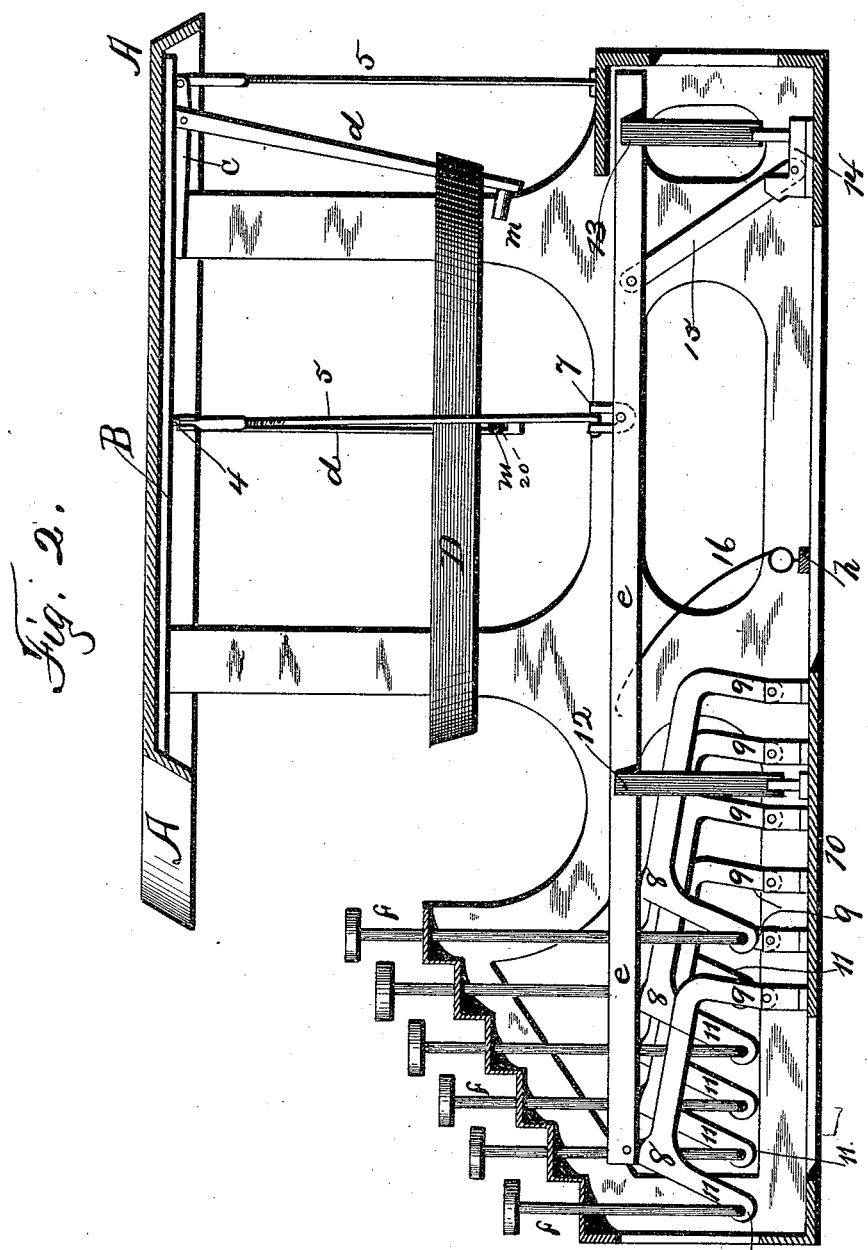
Figure 3:
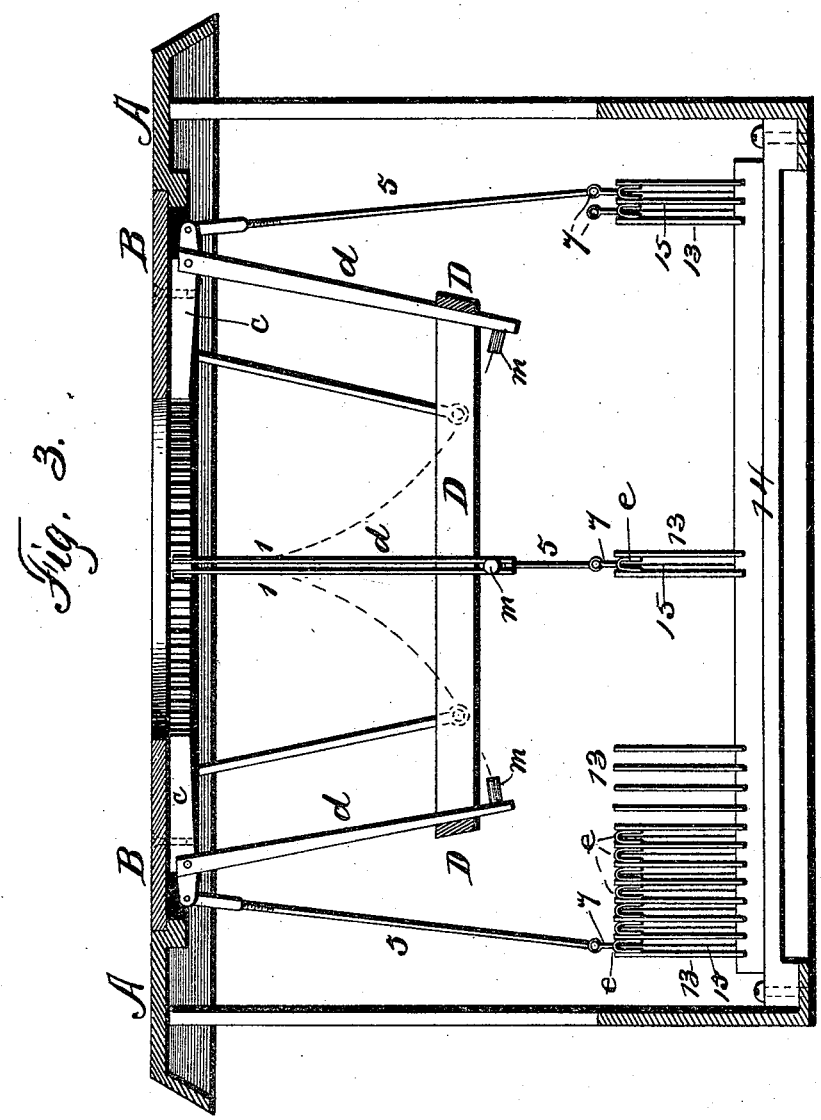
Figure 4:
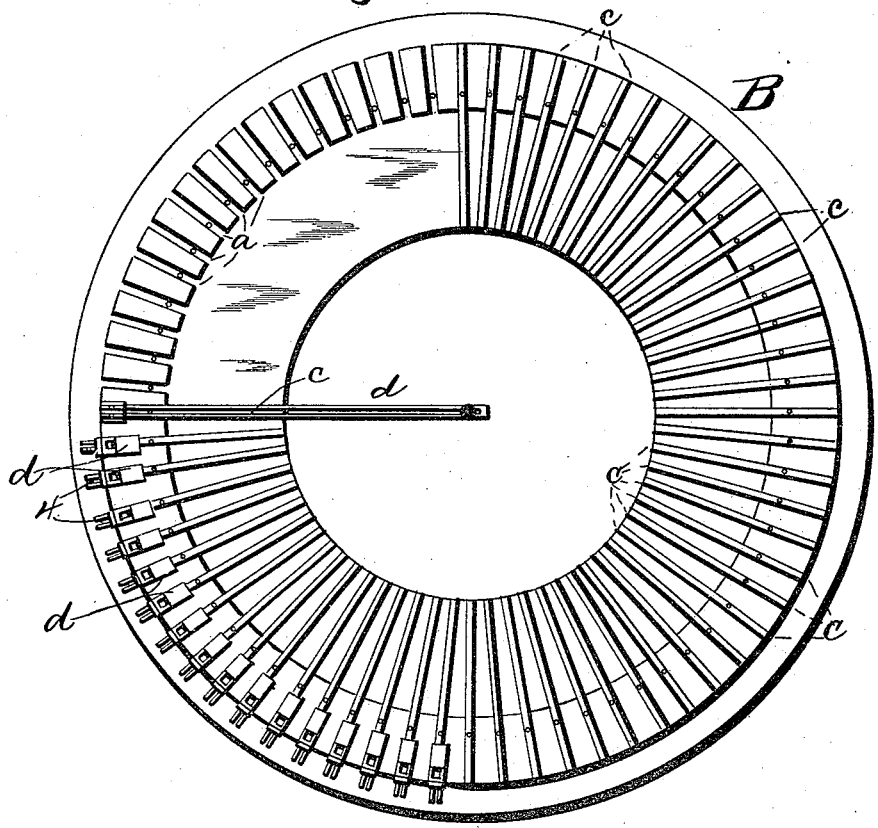
Figure 17:

Figure 1 is a top plan view of the machine without the carriage or carriage mechanism, but having a part of the type-bar ring broken out, showing a type-bar arm raised and another pendent, showing the combination, hanger-block guide and stop. Fig. 2 is a side elevation showing part of the top plate and one side of the frame cut away, and showing a full side elevation of the key-levers and the lever-operating mechanism and type-bar arms connected. Fig. 3 is a rear elevation showing part of the top plate and basket with the rear side of the frame cut away, and showing the rear ends of the levers and guides and with type-bar arms connected to the levers. Fig. 4 is a bottom plan of the type-bar ring, showing on the right half the hanger-blocks and guides in position on the lower left-hand corner, type-bar arms mounted upon the hanger-blocks, and next upward a type-bar arm raised. Fig. 5 is a detached side elevation of a single mechanism for operating each of the type-bars, omitting the type-bar and its mountings, mounted and ready for operation by the depression of a button. Fig. 6 is a like view of the same in the position it assumes when a button is depressed. Fig. 7 is a plan of the crank-rocker for supporting each of the draw-bars. Fig. 8 is a like view of the rear hanger or support of each of the draw-bars. Fig. 9 is a side elevation of the type-bar arm detached. Fig. 10 is a top plan view thereof. Fig. 11 is a plan showing the arrangement in different lengths of the draw-bars in groups of six. Fig. 12 is an enlarged detail showing a rear elevation of the type-bar arm and crank-connection. Fig. 13 is a sectional elevation of the type-bar arm and type mounted therein. Fig. 14 is an enlarged detail of the rear draw-bar support, its mounting, and the guides for the support and keys. Fig. 15 is an enlarged sectional detail of the hinge by which each draw-bar is connected to each connecting or pull rod leading to each type-bar arm. Fig. 16 is a sectional detail of the same, excepting that the hinge levers or arms are adapted to be sprung apart to permit the trunnions upon the head of the connecting-rod to be snapped into the bearings. Fig. 17 shows a side plan and edge plan of the hinges and guides. Fig. 18 is a sectional elevation of the top plate, the auxiliary ring, the combined hangers and guides, and one type-arm depressed and one thrown up and in longitudinal vertical section, showing the guide within the type-arm and the cross-bar in contact with the guide. Fig. 19 is a side elevation of the type-arm and guide detached, said guide being within the type-arm, as shown in Fig. 18.

A is the top plate mounted upon a main frame and having a central inwardly-flanged aperture, in which we place the outwardly-flanged type-bar ring-plate B.

C' is an auxiliary ring integral with or secured to the bottom of the plate B and concentric therewith, and this ring is provided with shallow radial grooves $a$. In each of these grooves we secure by a screw $b$ one of the combined hanger-blocks and type-bar arm-guides $c$, which project inwardly and radial from the inner edge of the ring C to the inner edge of the plate B.

Each of the type-bar arms $d$ is of like construction, comprising two side bars 1, a solid piece 2 at the lower or inner end connecting the sides, and a cross-bar 3 across the outer or upper end, thus leaving substantially the whole length open between the side bars, so as to prevent the type-arm from catching dust and at the same time reducing its weight without weakening it.

A Y of sheet metal fits over the pivot end of each type-bar and is secured thereto, and this end is perforated transversely to receive the pivot-pin which connects each type-bar to its hanger-block, the free end of the Y constituting the arm 4, by which each type-bar is operated through the pull-rod or connecting-rod 5, which consists of two pieces, the upper one being pivotally connected to the arm 4 and having its lower end tubular and threaded to receive the rod 5, whose lower end is hinged to its draw-bar $e$, as hereinafter described.

Each draw-bar $e$ consists of a piece of light channel-iron or sheet metal folded longitudinally, creating a bar of somewhat U shape in cross-section with parallel sides. These bars are inverted and each has a slotway 6 cut in its upper edge to receive the female part 7 of the hinge, which connects the pull-rod 5 to the bar, this end of the rod being provided with side trunnions which fit in the bearings in the upper end of the hinge-leaf 7, and this leaf is inserted through the slot 6 and is pivotally secured between the sides of the draw-bar.

To the front end of each key-bar we pivotally connect the top of a crank-lever 8 of substantially the form shown in the drawings, having a rear leg 9, connected to an upright upon the bottom 10 of the frame of the machine, and a front and outwardly-projecting arm 11, to which we pivotally connect the lower end of the shank of a button $f$. Adjacent to the front end of the draw-bar we erect a series of parallel guides 12, having vertical slots, in which the bars fit freely and move vertically and longitudinally. Adjacent to the rear end we also erect another series of guides 13 like unto the front guides 12 in construction and operation. In front of these rear guides we secure a slotted or transversely-grooved bar 14, and in each of these slots we pivotally mount a brace 15, the top of which is pivotally connected to the rear portion of the bar and constitutes a rear support therefor. The two pivots of the brace 15 are in a line practically parallel with the corresponding two pivots of the crank-lever 8, (see Fig. 6,) whereby the said brace and lever in action maintain the draw-bar $e$ always horizontal or in position parallel with its position of rest, so that type-rods connected with the draw-bars at different points in the length of the draw-bar will be equally moved by equal movements of the buttons or keys $f$. This enables the differently-located types to be directly reached in all their positions by their respective connecting-rods 5 and tends to maintain an even action to the keys.

A bar $h$, extending across the frame of the machine, carries and holds one end of each of the bar-springs 16, the upper end of which bears upward against the draw-bar and aids in raising it to its normal position after depression.

The type-blocks $m$ carry the letter, sign, or symbol upon their exposed end, and the other end is first reduced in size to create a shank or stem 17, which fits closely between the bars of the type-arm, the shoulder 18 resting and having its bearing upon these side bars, and 19 is a washer fitting over the stem, and 20 is a nut, which when screwed up secures the type in position in the type-arm at any point longitudinally adjacent to the end and also at any angle as to the letter thereon, so as to bring the characters into proper alignment.

The machine is operated as follows: As this bar is thus operated it exerts a downward draw upon its pull-rod, and the hinge-leaf swings upon its pivot, thus taking up all of the otherwise torsional strain, or at least reduces it to a minimum, so that the rod accommodates itself to the swinging of the bar and draws down the outer arm of the type-arm and throws the type quickly upward. Each type-arm is pivoted at its outer end upon the outward end of the hanger-block, which block lies partly between the sides of the type-arm, so that as the arm is swung upward the block will guide it, until when the arm reaches the limit of the stroke the whole length of the block will be within or between the sides of the type-arm, thus guiding and supporting it laterally during the whole stroke, and the type-arm $d$ is limited in its upward or stroke movement by its cross-bar 3 meeting the block $c$, Fig. 18. Then the gravity of the type-arm, operating with the lift of the bar-spring, will bring the type-arm back to its normal position, resting against the basket-ring D, and restore the bar and the buttons to their normal position. The front and rear guides support the bars laterally and steady them in their swinging motion both ways. Also the slots in which the lower ends of the rear supports are mounted operate to steady and guide them in their movements, and thus the bars always move in a vertical plane, always exerting the same force upon the type-arms, and thus always striking a blow of the same impetus against the printing-platen. It will be seen that we can remove any type-arm by springing its pull-rod out of the bearings in the hinge, by springing the bearings apart until one or both of the trunnions are free, and by removing the screw which holds the hanger and guide block in place against the ring, and the type-arm can be replaced by reversing this operation. The shallow radial grooves in the auxiliary ring operate to always maintain the hangers and guide-blocks in their proper radial line.

The cross-bar at the heel of the type-arm operates as a stop to check the upward movement of the arm, or, rather, its outer end when it strikes against the lower edge of the guide-block near its outer end, and while this stops the inner part the momentum of the outer end causes this end to spring upward elastically, so that the stroke of the type thereon is not a dead strike, thus enabling us to manifold much more effectively than where the elasticity of the stroke depends upon the give or spring of the arm after the type has struck the platen. These type-arms are preferably constructed by taking a rectangular bar of steel and milling out the longitudinal slotway and the groove in the outer end, thus making the whole bar, including the cross-bar, of a single piece of metal. We adjust the length of the pull-rods or vary it by disconnecting the lower end of a rod from the hinge, screwing it up, or unscrewing it, and then reconnecting it to the hinge, as before described. The alignment of the type themselves is effected by loosening a type, sliding it in the arm longitudinally or twisting it therein, and then tightening up the nut.

What we claim as our invention, and desire to secure by Letters Patent, is—

1. A draw-bar mounted horizontally upon and movable vertically by swinging supports and connected with a type-arm independently of the said supports.

2. A draw-bar mounted upon swinging supports, in combination with vertical guides on either side of the bar.

3. A draw-bar mounted upon swinging supports, in combination with vertical guides on either side of the bar and auxiliary guides for the supports.

4. A draw-bar mounted upon swinging supports, in combination with vertical guides on either side of the bar and a return-spring engaging with the bar.

5. A draw-bar mounted upon swinging supports, in combination with a hinge-leaf pivotally mounted therein and swinging in conjunction with the bar.

6. A draw-bar mounted upon swinging supports and a hinge-leaf pivoted upon the bar, in combination with the type-arm pivotally mounted, the rod connecting it to the hinge-leaf, and a return-spring engaging with the bar.

7. A draw-bar mounted upon swinging supports, a hinge-leaf pivotally connected to the bar, and means to guide the bar in its vertical movements, in combination with the type-arm pivotally mounted, a rod connecting it adjustably to the hinge-leaf, and a return-spring engaging with the bar.

8. A draw-bar mounted upon swinging supports, a hinge-leaf pivotally connected to the bar, and means to guide the bar and supports in their vertical movements, in combination with the type-arm pivotally mounted, a rod connecting it adjustably to the hinge-leaf, and a return-spring engaging with the bar.

9. A draw-bar swinging outward and downward upon swinging supports pivotally connected to the ends thereof, in combination with an actuating-button and a return-spring engaging with the bar.

10. A draw-bar mounted upon swinging supports, in combination with a hinge-leaf pivotally mounted upon the bar and provided with spring-arms detachably carrying the bearings of the lower ends of the pull-rod between the hinge and type-arm, and the type-arm.

11. A type-arm slotted longitudinally and pivoted upon and in combination with a combined radial hanger-block and guide detachably connected to the type-bar ring and means for actuating the type-arm.

12. A type-bar ring and an auxiliary radially-grooved ring upon the under side thereof, in combination with a block fitting a groove in the ring and secured therein.

13. A type-bar ring and an auxiliary radially-grooved ring upon the under side thereof, in combination with a block fitting a groove in the ring and detachably secured therein and projecting inward radially beyond the auxiliary ring.

14. A type-arm slotted longitudinally and pivotally mounted, in combination with a type-body having a stem fitting through the slot and adjustable therein and means for adjustably securing it in the slotway in any desired position.

15. A type-bar ring and an auxiliary radially-grooved ring upon the under side thereof and a block fitting a groove in the ring and detachably secured therein and projecting inwardly radially beyond the auxiliary ring, in combination with a slotted type-arm pivotally mounted upon the outer end of the block and means for actuating the arm.

16. A draw-bar having its front end pivotally mounted upon a rocker which has a rear leg pivotally connected to the frame, a front arm connected pivotally to the button-shank, and a rear support pivotally connected to the frame and to the lever and slanting forward, in combination with an actuating-button connected to the front rocker.

17. The combination, with an elongated hanger-block detachably secured beneath the type-bar in a radial line, of a type-arm slotted longitudinally and pivotally mounted upon the block, and a cross-bar across the outer end of the type-arm adapted to engage with the block when the arm is raised.

18. A draw-bar pivotally mounted on a pair of pivoted supports, the two pivots of each support being in a line nearly parallel with the other.

19. A draw-bar pivotally mounted on pivoted supports and means for connecting a type with the draw-bar, whereby the draw-bar is kept throughout its movement parallel with its position of rest and the type will be equally moved whether its connection with the draw-bar be made at one place or another along the bar.

20. A draw-bar pivotally mounted on bracing pivoted supports adapted to carry the bar longitudinally and vertically with a motion such that it is always parallel to its position of rest, and means for connecting a type with the said bar.

In witness whereof we have hereunto set our hands this 27th day of February, 1890.

CHARLES M. CLINTON.
JAMES McNAMARA.

In presence of—
HOWARD P. DENISON,
F. T. DENISON.